(12) United States Patent
Jeon

(10) Patent No.: US 7,047,027 B2
(45) Date of Patent: May 16, 2006

(54) METHOD FOR TRANSMITTING SHORT MESSAGE SERVICE USING TAG

(75) Inventor: Byung-Su Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 10/271,427

(22) Filed: Oct. 15, 2002

(65) Prior Publication Data

US 2003/0100322 A1    May 29, 2003

(30) Foreign Application Priority Data

Nov. 28, 2001    (KR) ............................... 2001-74721

(51) Int. Cl.
*H04J 3/24* (2006.01)
(52) U.S. Cl. .................. 455/466; 455/412.1; 370/349; 370/253
(58) Field of Classification Search ................ 455/403, 455/466, 412.1, 412.2, 413, 66.1, 550.1, 455/566, 145, 158.5, 59, 61, 70, 72; 370/253, 370/312, 349, 389, 390, 395.1
See application file for complete search history.

(56) References Cited

U.S. PATENT DOCUMENTS

| 5,848,356 | A | * | 12/1998 | Jambhekar et al. ......... 455/403 |
| 5,903,832 | A | * | 5/1999 | Seppanen et al. ......... 455/435.3 |
| 5,966,663 | A | * | 10/1999 | Gleason ....................... 455/466 |
| 6,104,924 | A | * | 8/2000 | Shirai .......................... 455/418 |
| 6,424,829 | B1 | * | 7/2002 | Kraft ........................ 455/412.1 |
| 6,430,405 | B1 | * | 8/2002 | Jambhekar et al. ......... 455/403 |
| 6,587,691 | B1 | * | 7/2003 | Granstam et al. ........... 455/457 |
| 6,671,508 | B1 | * | 12/2003 | Mitsuoka et al. ........ 455/412.1 |
| 6,736,322 | B1 | * | 5/2004 | Gobburu et al. ....... 235/462.46 |
| 6,813,507 | B1 | * | 11/2004 | Gress et al. ................. 455/466 |
| 2002/0065110 | A1 | * | 5/2002 | Enns et al. .................. 455/566 |
| 2002/0068558 | A1 | * | 6/2002 | Janik .......................... 455/422 |
| 2002/0081972 | A1 | * | 6/2002 | Rankin ........................ 455/41 |
| 2003/0069004 | A1 | * | 4/2003 | Hamynen et al. ........... 455/412 |

FOREIGN PATENT DOCUMENTS

| GB | 2 338 098 A | 8/1999 |
| JP | 03-189864 | 8/1991 |
| WO | WO 99/29127 | 6/1999 |
| WO | WO 00/77677 A2 | 12/2000 |

\* cited by examiner

*Primary Examiner*—CongVan Tran
(74) *Attorney, Agent, or Firm*—Lee, Hong, Degerman, Kang & Schmadeka

(57) ABSTRACT

A method for transmitting a SMS message including various personal information manager (PIM) information associated with one or more corresponding tags is provided. In accordance with one aspect of the invention, the method comprises: displaying a main window in response to selection from a message menu; displaying a tag selection window in response to selection of a sub menu from the main window; creating a SMS message in response to selection of one or more tags from the tag selection window; and transmitting the SMS message including the one or more selected tags to a receiving terminal, wherein the one or more tags are provided to format certain content of the SMS message when displayed.

17 Claims, 4 Drawing Sheets

METHOD FOR TRANSMITTING SHORT MESSAGE SERVICE USING TAG

CROSS-REFERENCE TO RELATED APPLICATIONS

Pursuant to 35 U.S.C. § 119(a), this application claims the benefit of earlier filing date and right of priority to the Korean Application No. 2001-74721, filed on Nov. 28, 2001, entitled "Method for Transmitting Short Message Service Using Tag" the content of which is hereby incorporated by reference herein in its entirety.

BACKGROUND OF THE INVENTION

1. Field of the Invention

The present invention relates to a method for transmitting a short message service (SMS) message from a mobile communication terminal, and more particularly, to a method for transmitting a SMS message using a tag.

2. Description of the Background Art

Typically, a SMS message is created using an application program included in a mobile communication terminal (hereinafter, a terminal). This application program is referred to as an SMS editor. When a user selects a "message" menu included in a terminal, the SMS editor displays a main window that can display the SMS message on a liquid crystal display (LCD) according to control signals provided by a controller. When a user selects a "Language" menu using a soft key in the main window, the SMS editor displays a sub menu with options for a language type, Arabic numerals, capital letters or small letters of alphabet.

Selecting from the above options, a user can create a SMS message that includes text information, telephone numbers, or e-mail information. The user can then transmit the created SMS message to a receiving terminal.

According to the conventional method for transmitting an SMS message, it is not possible to provide various effects such as colors, blinking, and boldness to the text of the SMS message. Therefore, the text transmitted to the receiving terminal is displayed without any such effects on the LCD of the receiving terminal. Accordingly, it is not possible to emphasis any part of the forwarded message using the current SMS messaging method, albeit even in messages that contain advertisements.

Also, the conventional method for transmitting the SMS message, do not support the robust transmission of personal information manager (PIM) information, or the easy storage of names and other information items such as e-mail addresses and the like into a phone book or address book of the receiving terminal.

SUMMARY OF THE INVENTION

A method for transmitting a SMS message including various personal information manager (PIM) information associated with one or more corresponding tags is provided. In accordance with one aspect of the invention, the method comprises: displaying a main window in response to selection from a message menu; displaying a tag selection window in response to selection of a sub-menu from the main window; creating a SMS message in response to selection of one or more tags from the tag selection window; and transmitting the SMS message including the one or more selected tags to a receiving terminal, wherein the one or more tags are provided to format certain content of the SMS message when displayed.

In certain embodiments, the tag comprises at least one of a PIM tag or a text tag. A series of numbers are associated with the PIM tag and the text tag. The PIM tag comprises: a first PIM tag for identifying a name; a second PIM tag for identifying an e-mail; a third PIM tag for identifying one or more types of telephone numbers; and a fourth PIM tag for identifying group information, wherein the group information defines a category to which a telephone number belongs. The text tag comprises: a first text tag for designating a color format; a second text tag for designating a bold format; a third text tag for designating a blinking format; and a fourth text tag for designating background screen color format.

In accordance with one embodiment, a method for receiving a short message service (SMS) message comprises: receiving a SMS message including one or more tags for formatting certain content of the SMS message; determining whether one or more tags are included in the received SMS message; analyzing the one or more included tags; and formatting content of the SMS message according to the one or more tags.

In accordance with another embodiment of the invention, a method for transmitting a SMS message, comprises: displaying a tag selection window in response to selecting a sub menu from a main window; creating a SMS message, having text content, using a predetermined tag selected from the tag selection window; transmitting the created SMS message to a receiving terminal; determining whether a tag is used in the received SMS message; and applying a formatting effect to the text content of the SMS message in accordance with the respective tag used.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
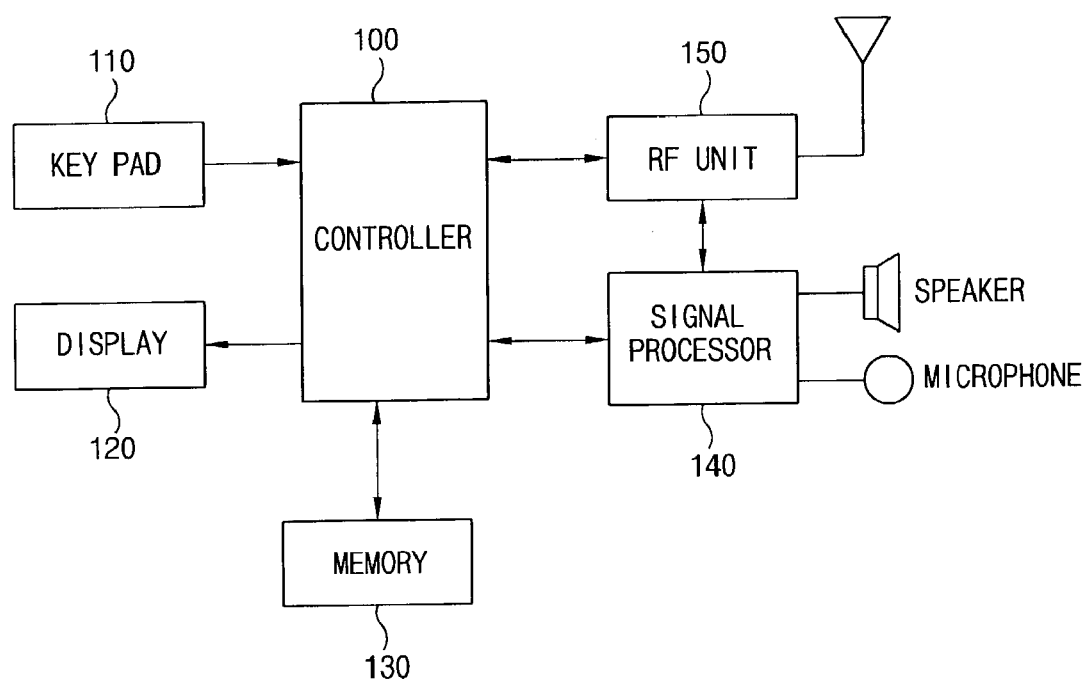
FIG. 1 is a schematic block diagram of a mobile communication terminal according to one embodiment of the invention.

FIG. 1 is a schematic diagram of a mobile communication terminal according to one embodiment of the invention. The mobile communication terminal comprises a controller 100, a keypad 110, a display 120, a memory 130, a signal processor 140, and an RF unit 150.

Controller 100 controls the operation of the mobile communication terminal (hereinafter, terminal) and application software for creating the SMS message. A keypad 110, that is, an apparatus for inputting user data, includes a plurality of number keys and various function keys.

Display 120 can be a liquid crystal display (LCD) or other type of display and displays the status of the terminal and the graphical or textual manifestation of execution of an application software. Memory 130 includes a random access memory (ROM), for example, for storing an application program (e.g., a tag editor), and an operation program. Memory 130 may also include an EEPROM and a random access memory (RAM) for storing user data.

Signal processor 140 modulates a speech signal input from a microphone to speech data and provides the speech data to radio frequency (RF) unit 150 or demodulates speech data input from the RF unit 150 into speech signals and outputs the speech signal through a speaker. The RF unit 150 transmits and receives the SMS message and various data items through an antenna under the control of the controller 100.

The creation of the SMS message and a method of transmitting the SMS message by the terminal having the above structure will now be described.

According to the present invention, a grammar tag and an application tag are defined to create a SMS message with personal information manager (PIM) and text effect information, and to transmit the SMS message to a receiving terminal.

The grammar tag according to the present invention is defined as follows. The start and the end of a tag are marked with "<" and ">" or other special characters, for example. After a tag start mark "<" is shown, a text form is shown. A text form is divided into a PIM tag and a text tag, as provided below.

1) PIM tag
  N: name
  E: e-mail
  T: type of telephone number (e.g., home, mobile, pager, business)
  G: groups or categories to which the telephone number belongs (e.g., family, friend, to client, business contact, school)
2) Text tag
  C: color
  B: bold
  G: background screen color
  S: blink The types of telephones are distinguished from group information by numbers in the T tag and the G tag. In some embodiments, the C tag and the G tag are generally used together with color information.

An SMS message editor is used to select the language, capital letters of alphabet, small letters of alphabet, and special characters. According to the present invention, a tag editor application software is provided that includes a tag selection menu that can be selected from a main menu. When the tag selection menu is selected, the controller 100 displays a prompt with a configuration of, for example, "<[Tag][option]>". It should be noted that the provided prompt is by way of example and other embodiments of the invention may be implemented to use other characters or features to provide a prompt. The displayed prompt may be edited by the user to reflect the appropriate choice of formatting, according to the tags.

Figure 2A:
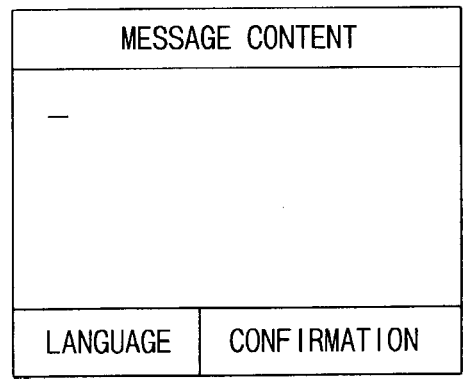
FIG. 2A illustrates a main window for creating a short message service (SMS) message, in accordance with one embodiment of the invention.

When a user selects a message menu option, the controller 100 displays a main window that can create a SMS message on the display 120 as shown in FIG. 2A. When the user selects a mode conversion key such as the "language" key included in one side of the main window, for example, the user may select a mode from among the following options: language, Arabic numerals, capital letters of alphabet, small letters of alphabet, special characters and tag mode. Depending on implementation fewer or additional modes or options may be provided. As such, it should be noted that the modes and options discussed herein are by way of example only and can vary based on the type of terminal or application software used.

Figure 2B:
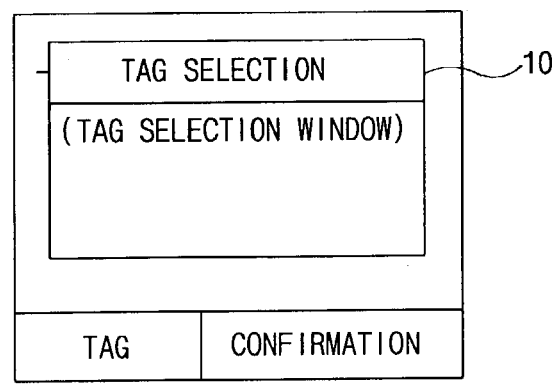
FIG. 2B illustrates a tag selection window for inserting a tag, in accordance with one embodiment of the invention.
Figure 3:
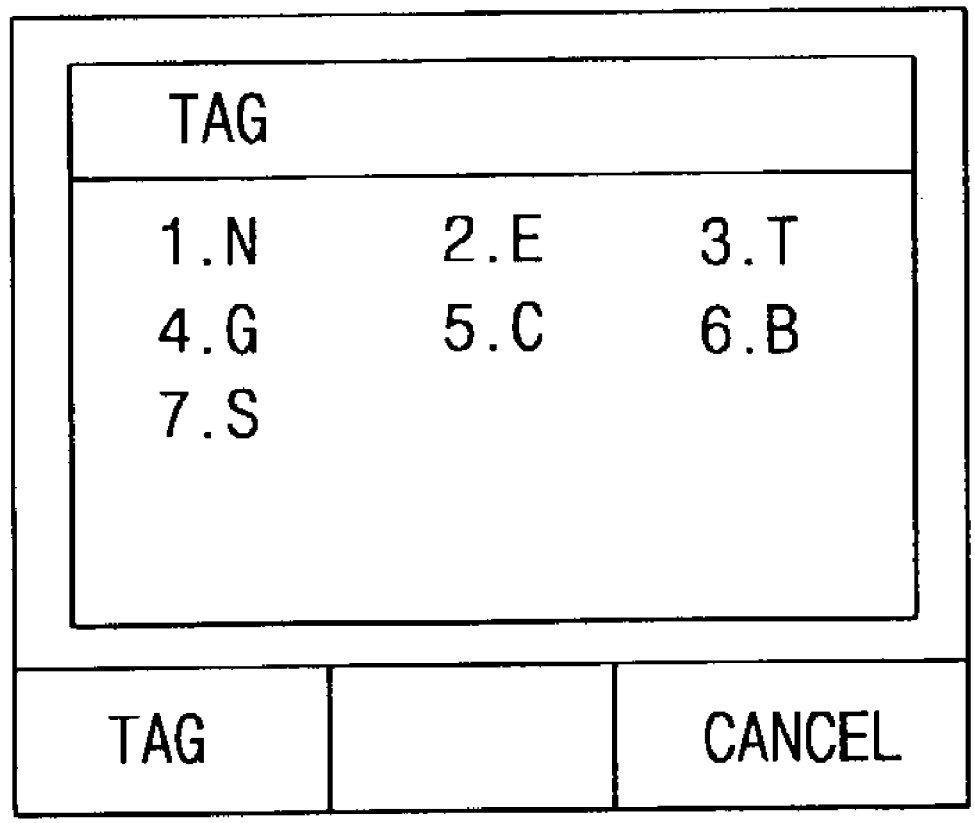
FIG. 3 illustrates a tag selection window displayed on the main window, in accordance with one embodiment of the invention.

When the tag mode is selected, the controller 100 displays a tag selection window 10 that provides the user with the option to select a PIM tag and a text tag. The tag selection window 10 can be displayed in the form of an additional area of the display 120 or a popup window as shown in FIG. 2B. Referring to FIG. 3, in accordance with one or more embodiments, a series of numbers may be associated with a PIM tag and a text tag as displayed in the tag selection window 10, so that the PIM tag and the text tag can be selected using the number keys (0, 1, 2, . . . and 9) from the keypad 110.

Figure 2C:
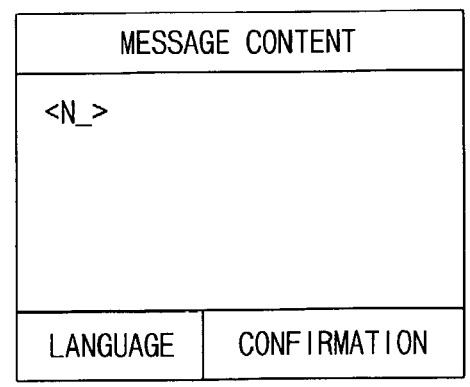
FIG. 2C illustrates a tag displayed in the main window during the selection of the tag, in accordance with one embodiment of the invention.

As such, a user can select the PIM tag and the text tag for creating the SMS message using the number keys. For example, a user may select tag N by inputting the number key "1". If tag N is selected then "<N_>", for example, is displayed on the main window as shown in FIG. 2C. A user can input PIM related information by inputting a name in the cursor position of the "<N_>". The under bar denotes the position of the cursor.

A user may select tag C by inputting the number key "5", for example, causing "<C_>" to be displayed on the main window. Thereafter, the user can edit the colors of the text and the background screen by inputting the desired color information at the cursor position. For example, the text color may be designated by inputting CR (red), CB (blue), CG (light green), CY (yellow), and CC (sky blue). Similarly, the color of the background screen may be designated by inputting GR, GB, GG, GY, and GC. As such the colors of the text and the background screen can be added/changed according to the color resolution supported by the graphic controller of a mobile telephone.

For example, if the user creates a SMS message such as, "<N Hong gil-dong> <Ehong@abc.com> <CY Hello>" using the PIM tag and the text tag, "Hong gil-dong hong@abc.com Hello" is displayed on the display of the receiving terminal. "Hello" is displayed in yellow. If the terminal is without a tag analyzing function, the content is displayed as a common message including the special characters (e.g., "<"). If the terminal includes the tag analyzing function, the special characters are not displayed.

It is possible to create a SMS message by inserting another tag into a tag. That is, according to the present invention, it is possible to insert another tag C within a tag C, for example. If "<GB> <N hong gil-dong> <Ehong@abc.com> <CY Hello I am <CR hong gil-dong> Nice-to meet you>" is transmitted to the receiving terminal, the background color of the screen will be blue; "Hello I am" and "Nice to meet you" will be yellow; and the "hong gil-dong" will be red.

Referring to FIG. 3, the user, in one or more embodiments, may select the PIM tags (N, E, T, and G) and/or the text tags (C, B, G, and S) using number keys (1 through 7) displayed on the tag selection window to insert the desired information into the cursor position of the selected tag, and thus create a SMS message. In certain embodiments, the SMS message is limited in length to 80 characters, for example, including the tags. Depending on implementation and selected language, the length limit may vary. After the SMS message is created, it is transmitted to the receiving terminal by way of the RF unit 150 in response to a user pressing a transmit key on the keypad 110, for example.

Figure 4:
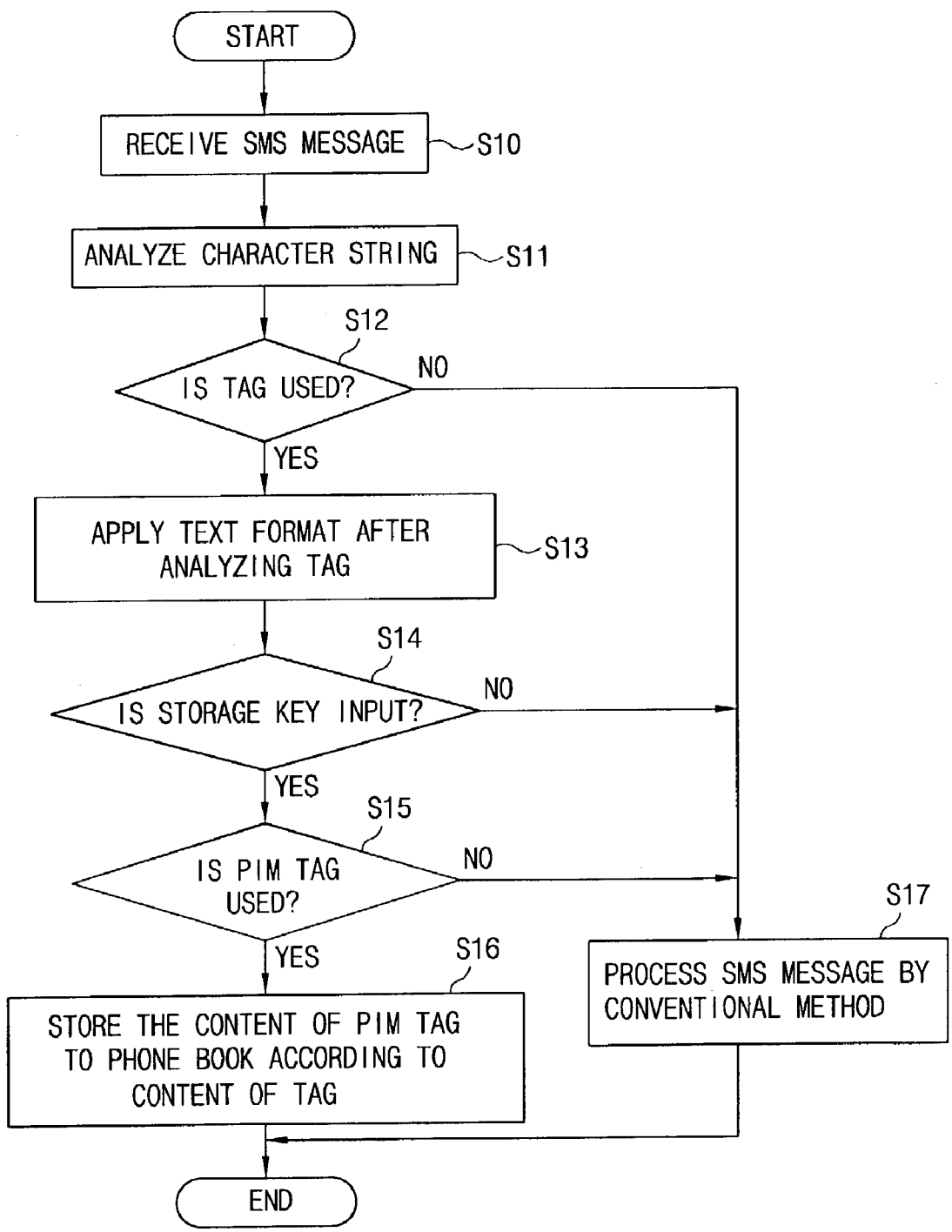
FIG. 4 is a flow diagram illustrating a method of processing the SMS message by a receiving terminal.

Referring to FIG. 4, when the SMS message is received, at state S10, the controller 100 of the receiving terminal analyzes the character string of the received SMS message and checks whether a tag is included in the message at states S11 and S12, respectively. If no tag is included, the controller processes the SMS message using the conventional method, at state S17. If a tag is used, the controller analyzes the tag and accordingly applies the appropriate text to format the SMS message; and displays the formatted SMS message on the display at state S13.

If the user presses a storage key at state S14, the controller 100 checks whether PIM tags are included in the transmitted SMS message at state S15. If so, at state S16, the information inserted into the PIM tags is automatically stored in a data management base, such as a phone book, for example, based on the type of the tag used. For example, if a PIM tag, <N hong gil-dong> is included in the SMS message, the controller 100 stores the "hong gil-dong" in the section of the phone book where names are stored. Therefore, the user does not need to perform any additional steps for inputting the name.

In other embodiments of the invention, the grammar tag and the types of tags used may be different from the ones discussed above. Additional tags can be added according to the provider of the terminal, the enterpriser of the terminal, and the performance of the terminal.

The technology described herein may be utilized by the manufacturing company of the terminal to provide functions corresponding to the respective tags without changing an SMS transmission format. A tag protocol may be used to provide service between the enterpriser of the terminal and the manufacturing company of the terminal.

As mentioned above, according to the present invention, it is possible to emphasize certain content in a message, such as advertisements, by applying various formats and effects such as color, blinking, and boldness to the text of the SMS message, using text tags.

According to one or more embodiments of invention, it is also possible to provide various PIM information items by transmitting the SMS message using the PIM tag and to store the transmitted PIM information in, for example, a phone book by way of a single key stroke on the keypad 110.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for transmitting a message, the method comprising:
   creating content for a message; and
   including tags of one or more categories in the message to format certain content,
   wherein transmission format is unchanged by the including of the tags of the one or more categories, and
   wherein a prompt to include a tag in the message comprises a first segment and a second segment, the first segment representing a tag selectable from a set of tags, and the second segment representing an option selectable from a set of options corresponding to said tag.

2. The method of claim 1, wherein the first segment is followed by the second segment when displayed.

3. A method for transmitting a message, the method comprising:
   creating content for the message; and
   including tags of one or more categories in the message to format certain content,
   wherein transmission format is unchanged by the including of the tags of the one or more categories, and
   wherein a tag comprises a personal information manager (PIM) tag and a text tag, and
   wherein the PIM tag comprises:
   a first PIM tag for identifying a name;
   a second PIM tag for identifying an e-mail;
   a third PIM tag for identifying one or more types of telephone numbers; and
   a fourth PIM tag for identifying group information, wherein the group information defines a category to which a telephone number belongs.

4. The method of claim 3, wherein the one or more types of telephone numbers are associated with one or more corresponding numbers, wherein each number defines a type of telephone number.

5. The method of claim 3, wherein the group information is represented by one or more numbers, wherein each number defines a contact category.

6. A method for transmitting a message, the method comprising:
   creating content for a message; and
   including tags of one or more categories in the message to format certain content,
   wherein transmission format is unchanged by the including of the tags of the one or more categories, and
   wherein a tag comprises a personal information manager (PIM) tag and a text tag, and
   wherein the text tag comprises:
   a first text tag for designating a color format;
   a second text tag for designating a bold format;
   a third text tag for designating a blinking format; and
   a fourth text tag for designating background screen color format.

7. A method for transmitting a message comprising:
   displaying a main window in response to selection from a message menu;
   displaying a tag selection window in response to selection of a sub menu from the main window;
   creating a message in response to selection of tags of one or more categories from the tag selection window; and
   transmitting the message including the one or more selected tags to a receiving terminal,
   wherein the one or more tags are provided to format certain content of the message when displayed, and
   wherein the tag is selected from a tag selection window, and
   wherein the tag comprises at least one of a PIM tag or a text tag, and
   wherein a series of numbers are associated with the PIM tag and the text tag, respectively, and
   wherein the PIM tag comprises at least one of:
   a first PIM tag for identifying a name;
   a second PIM tag for identifying an e-mail;
   a third PIM tag for identifying one or more types of telephone numbers; and
   a fourth PIM tag for identifying group information, wherein the group information defines a category to which a telephone number belongs.

8. The method of claim 7, wherein the text tag comprises at least one of:
   a first text tag for designating a color format;
   a second text tag for designating a bold format;
   a third text tag for designating a blinking format; and a fourth text tag for designating background screen color format.

9. The method of claim 8 further comprising:
receiving a SMS message including one or more tags for formatting certain content of the SMS message;
analyzing the SMS message to detect the one or more included tags;
applying respective formatting associated with the one or more tags to corresponding content of the SMS message; and
displaying the SMS message according to the formatting.

10. A method for receiving a message, the method comprising:
receiving a message including tags of one or more categories for formatting certain content of the message;
determining whether one or more tags are included in the received message;
analyzing the one or more included tags; and
formatting content of the message according to the one or more tags,
wherein the one or more categories of tags are selected from the group consisting of: a personal information manager (PIM) tag; and a text tag.

11. The method of claim 10, wherein the PIM tag includes at least one of the group consisting of:
a first PIM tag for identifying a name;
a second PIM tag for identifying an e-mail;
a third PIM tag for identifying one or more types of telephone numbers; and
a fourth PIM tag for identifying group information, wherein the group information defines a category to which a telephone number belongs.

12. The method of claim 10, wherein the text tag includes at least one of the group consisting of:
a first text tag for designating a color format;
a second text tag for designating a bold format;
a third text tag for designating a blinking format; and
a fourth text tag for designating background screen color format.

13. A method for receiving a message, the method comprising:
receiving a message including tags of one or more categories for formatting certain content of the message;
determining whether one or more tags are included in the received message;
analyzing the one or more included tags; and
formatting content of the message according to the one or more tags,
wherein the formatting is applied to configure text included within the content of the message;
the method further comprising:
determining whether the message includes at least one personal information manager (PIM) tag; and
storing a certain content associated with at least one PIM tag to a corresponding PIM category.

14. The method of claim 13, wherein the PIM tag comprises at least one of:
a first PIM tag for identifying a name;
a second PIM tag for identifying an e-mail;
a third PIM tag for identifying one or more types of telephone numbers; and
a fourth PIM tag for identifying a group information, wherein the group information defines a category to which a telephone number belongs.

15. The method of claim 13, wherein the text tag comprises at least one of:
a first text tag for designating a color format;
a second text tag for designating a bold format;
a third text tag for designating a blinking format; and
a fourth text tag for designating a background screen color format.

16. A method for receiving a message, comprising:
receiving the message;
selecting to store the message by a user;
determining whether the message includes at least one personal information manager (PIM) tag of one or more categories; and
storing a certain content associated with at least one PIM tag to a corresponding PIM category,
wherein the PIM tag comprises at least one of:
a first PIM tag for identifying a name;
a second PIM tag for identifying an e-mail;
a third PIM tag for identifying one or more types of telephone numbers; and
a fourth PIM tag for identifying a group information, wherein the group information defines a category to which a telephone number belongs.

17. A method for receiving a message, comprising:
receiving the message;
selecting to store the message by a user;
determining whether the message includes at least one personal information manager (PIM) tag of one or more categories; and
storing a certain content associated with at least one PIM tag to a corresponding PIM category,
wherein the text tag comprises at least one of:
a first text tag for designating a color format;
a second text tag for designating a bold format;
a third text tag for designating a blinking format; and
a fourth text tag for designating a background screen color format.

* * * * *